(12) United States Patent
Porter et al.

(10) Patent No.: US 11,966,061 B2
(45) Date of Patent: Apr. 23, 2024

(54) NEAR-EYE DISPLAY WITH PIVOT WAVEGUIDE AND CAMERA

(71) Applicant: Vuzix Corporation, West Henrietta, NY (US)

(72) Inventors: Tyler W. Porter, Honeoye Falls, NY (US); Paul J. Travers, Honeoye Falls, NY (US)

(73) Assignee: Vuzix Corporation, West Henrietta, NY (US)

(*) Notice: Subject to any disclaimer, the term of this patent is extended or adjusted under 35 U.S.C. 154(b) by 0 days.

(21) Appl. No.: 17/791,007

(22) PCT Filed: Jan. 5, 2021

(86) PCT No.: PCT/US2021/012185
§ 371 (c)(1),
(2) Date: Jul. 6, 2022

(87) PCT Pub. No.: WO2021/141898
PCT Pub. Date: Jul. 15, 2021

(65) Prior Publication Data
US 2023/0027372 A1   Jan. 26, 2023

Related U.S. Application Data

(60) Provisional application No. 62/957,761, filed on Jan. 6, 2020.

(51) Int. Cl.
*G02B 27/01* (2006.01)
*H04N 23/56* (2023.01)
*H04N 23/695* (2023.01)

(52) U.S. Cl.
CPC ..... *G02B 27/0176* (2013.01); *G02B 27/0172* (2013.01); *G02B 2027/0138* (2013.01);
(Continued)

(58) Field of Classification Search
CPC ............ G02B 27/0176; G02B 27/0172; G02B 2027/0138; G02B 2027/0154; H04N 23/695; H04N 23/56
See application file for complete search history.

(56) References Cited

U.S. PATENT DOCUMENTS 9,094,677 B1   6/2015   Mendis et al.
2015/0241959 A1*  8/2015   Abovitz ............. G02B 27/4205
                                                345/633

(Continued)

FOREIGN PATENT DOCUMENTS

CN        202758142 U      2/2013
CN        108700714 A     10/2018
(Continued)

OTHER PUBLICATIONS

International Search Report and Written Opinion dated Mar. 18, 2021 in International Application No. PCT/US2021/012185.

*Primary Examiner* — Kenneth B Lee, Jr.
(74) *Attorney, Agent, or Firm* — Harter Secrest & Emery LLP; Jacob D. Merrill, Esq.

(57) ABSTRACT

A near-eye display system including an optics module coupled with an electronics module having a controller. Wherein the optics module includes a planar waveguide operable to display virtual images, and a camera operable to capture pictures and videos. The planar waveguide coupled with the camera via the optics module, whereby a first view through the planar waveguide is oriented to be the same as a second view by the camera.

18 Claims, 8 Drawing Sheets

(52) U.S. Cl.
CPC ...... *G02B 2027/0154* (2013.01); *H04N 23/56* (2023.01); *H04N 23/695* (2023.01)

(56) References Cited

U.S. PATENT DOCUMENTS

| | | |
|---|---|---|
| 2016/0103325 A1 | 4/2016 | Optinvent |
| 2016/0370590 A1 | 12/2016 | Fujishiro |
| 2017/0299869 A1* | 10/2017 | Urey ................... G03H 1/2294 |
| 2020/0264434 A1* | 8/2020 | Shin ........................ G03H 1/02 |

FOREIGN PATENT DOCUMENTS

| | | | |
|---|---|---|---|
| CN | 108700742 A | | 10/2018 |
| CN | 113655617 A | * | 11/2021 |
| DE | 202012003317 U1 | | 7/2012 |
| JP | 2008533507 A | | 8/2008 |
| JP | 2013239767 A | | 11/2013 |
| JP | 2017011436 A | | 1/2017 |
| JP | 2019508925 A | | 3/2019 |
| JP | 2020527744 A | | 9/2020 |
| WO | 2006085310 A1 | | 8/2006 |
| WO | 2017120346 A1 | | 7/2017 |
| WO | 2017120353 A1 | | 7/2017 |
| WO | 2019018396 A1 | | 1/2019 |

* cited by examiner

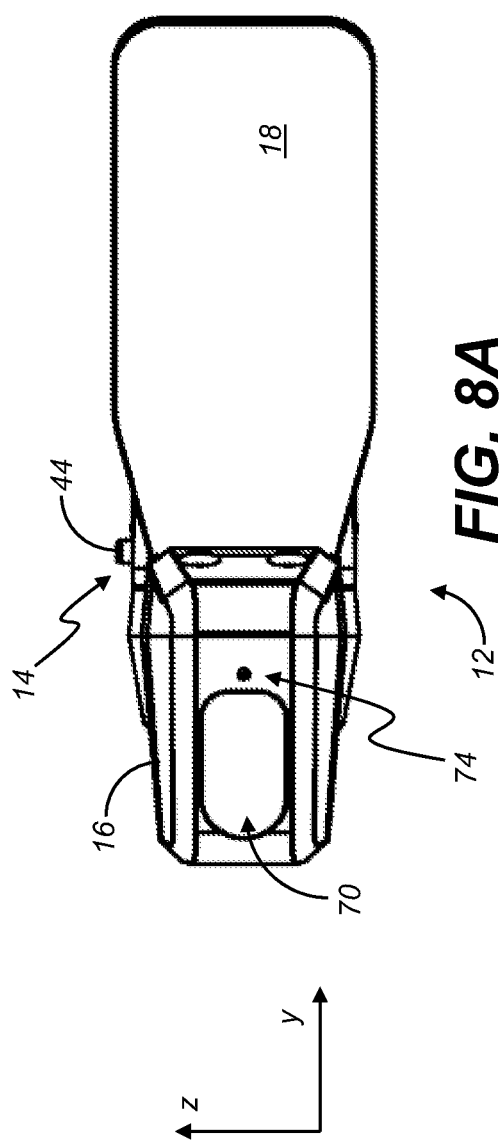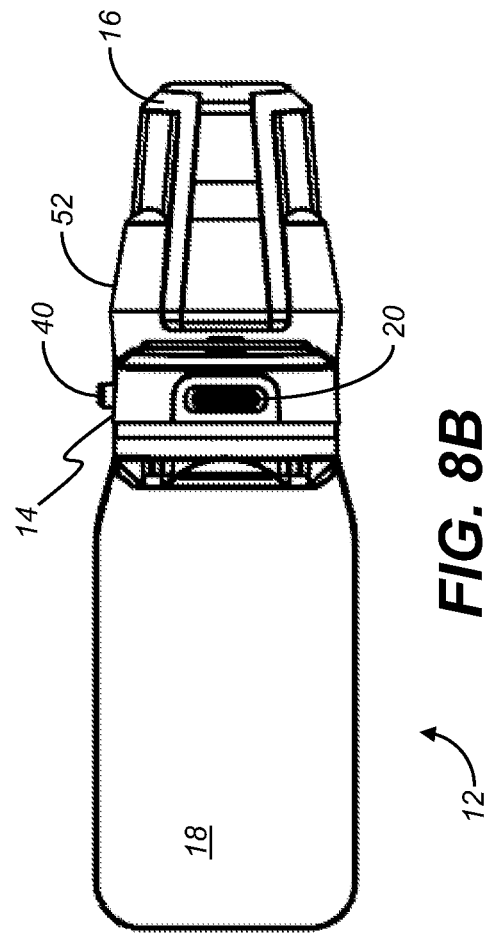

NEAR-EYE DISPLAY WITH PIVOT WAVEGUIDE AND CAMERA

TECHNICAL FIELD

The present disclosure generally relates to near-eye display systems, head-mounted displays, and the like, utilizing a planar waveguide and a camera both mounted to jointly pivot.

BACKGROUND

Head-Mounted Displays (HMD's) and virtual image near-eye displays are being developed for a range of diverse uses, including military, commercial, industrial, fire-fighting, and entertainment applications. For many of these applications, there is value in forming a virtual image that can be visually superimposed over the real-world image that lies in the field of view of the HMD user. An optical image light guide may convey image-bearing light to a viewer in a narrow space for directing the virtual image to the viewer's pupil and enabling this superposition function.

Although conventional near-eye displays may be utilized to view virtual images, conventional near-eye displays at least partially obstruct the wearer's view of the environment. As described herein, planar waveguides (e.g., optical image light guides) may be utilized to view virtual images displayed to a person wearing the near-eye display system and are less obstructive-of-view than other near-eye display systems.

SUMMARY

The present disclosure provides for a near-eye display system. In a first exemplary embodiment, a near-eye display system includes an optics module coupled with an electronics module having a controller. Wherein the optics module includes a planar waveguide operable to display virtual images, and a camera operable to capture pictures and videos. The planar waveguide is coupled with the camera via the optics module, whereby a first view through the planar waveguide is oriented to be the same as a second view by the camera.

In a second exemplary embodiment, a near-eye display system comprises a planar waveguide suitable for displaying virtual images, at least one camera suitable for capturing picture and/or video of the environment, an optics module housing the camera and mechanically securing the waveguide relative thereto such that a portion of the view through the planar waveguide is oriented to be the same as a portion of the view of the camera.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIG. 8A shows a front elevational view of a near-eye display system according to an exemplary embodiment of the presently disclosed subject matter.

FIG. 8B shows a rear elevational view of the near-eye display system according to FIG. 8A.

DETAILED DESCRIPTION

Figure 1A:
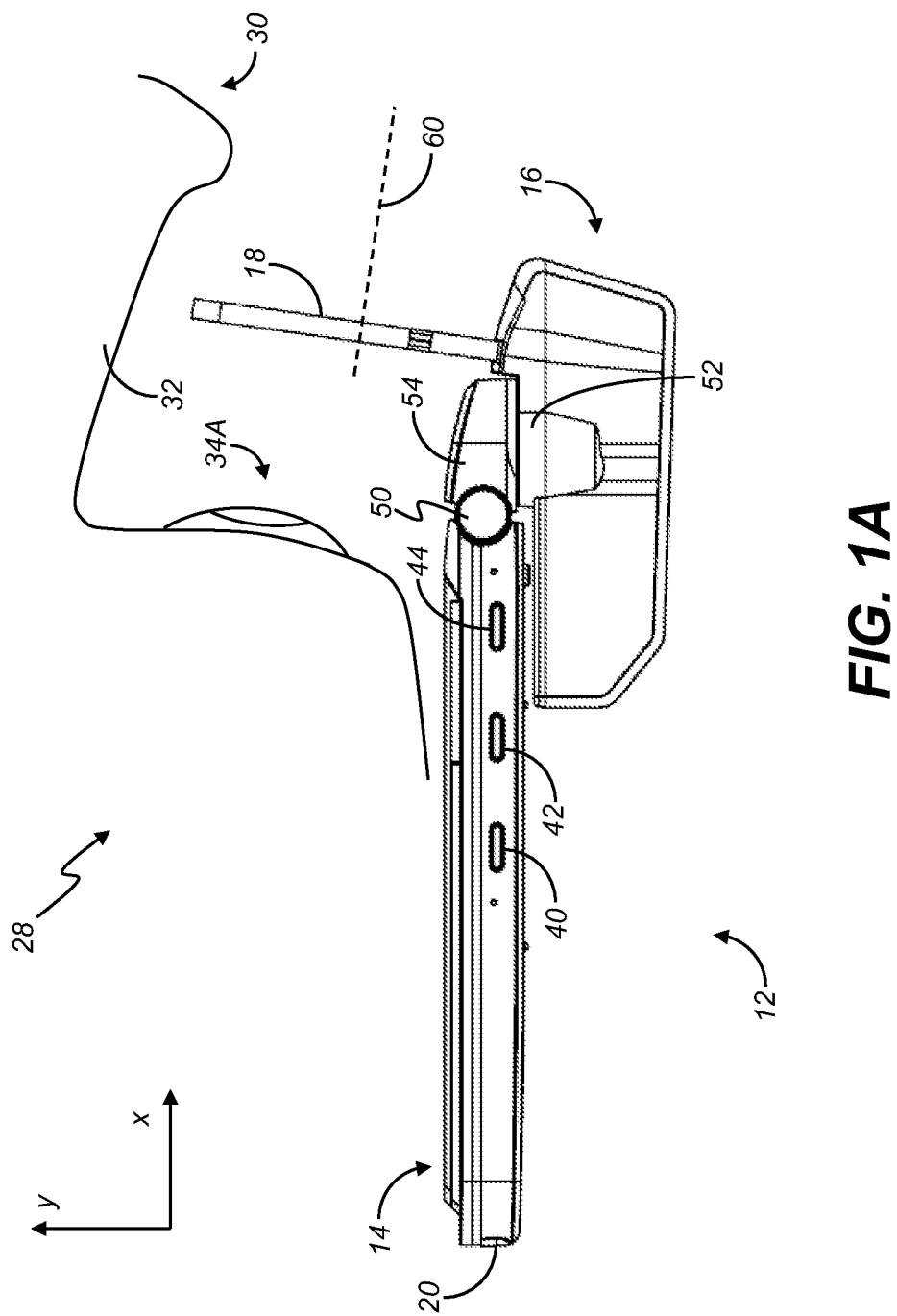
FIG. 1A shows a top-down view of a near-eye display system according to an exemplary embodiment of the presently disclosed subject matter.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application. Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears and views images using the display or viewing device.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered oblique with respect to each other if they diverge from or converge toward each other at an angle that is greater than zero degrees and less than ninety degrees away from parallel, or greater than zero degrees and less than ninety degrees away from orthogonal.

The term "coupler" in the context of optics refers to an intermediate structure that facilitates the travel of light from one optical medium or device to another optical medium or device.

As an alternative to real image projection, an optical system, such as an HMD, can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality display. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

An image light guide may utilize image-bearing light from a light source such as a projector to display a virtual image. For example, collimated, relatively angularly encoded, light beams from a projector are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements (HOEs) or in other known ways. For example, the diffraction grating can be formed by surface relief After propagating along the waveguide, the diffracted light can be directed back out of the waveguide by a similar output coupling such as an out-coupling diffractive optic, which can be arranged to provide pupil expansion along one dimension of the virtual image. In addition, a turning grating can be positioned on/in the waveguide to provide pupil expansion in an orthogonal dimension of the virtual image. The image-bearing light output from the waveguide provides an expanded eyebox for the viewer.

A person wearing a near-eye display utilizing a planar waveguide views both the environment through the planar waveguide as well as a virtual image or virtual video image generated by the near-eye display system overlaid onto the environment. In some cases, it is advantageous to have a camera view the environment. The camera view, possibly utilizing image analysis software, may be utilized to display environmental cues to the person wearing the near-eye display system. It is therefore important for the camera view to align with the person's view through the planar waveguide. When the planar waveguide is rotated, for example, for comfort of wearing the near-eye display system, it is important that the camera view remain aligned with the person's view through the planar waveguide.

Figure 1B:
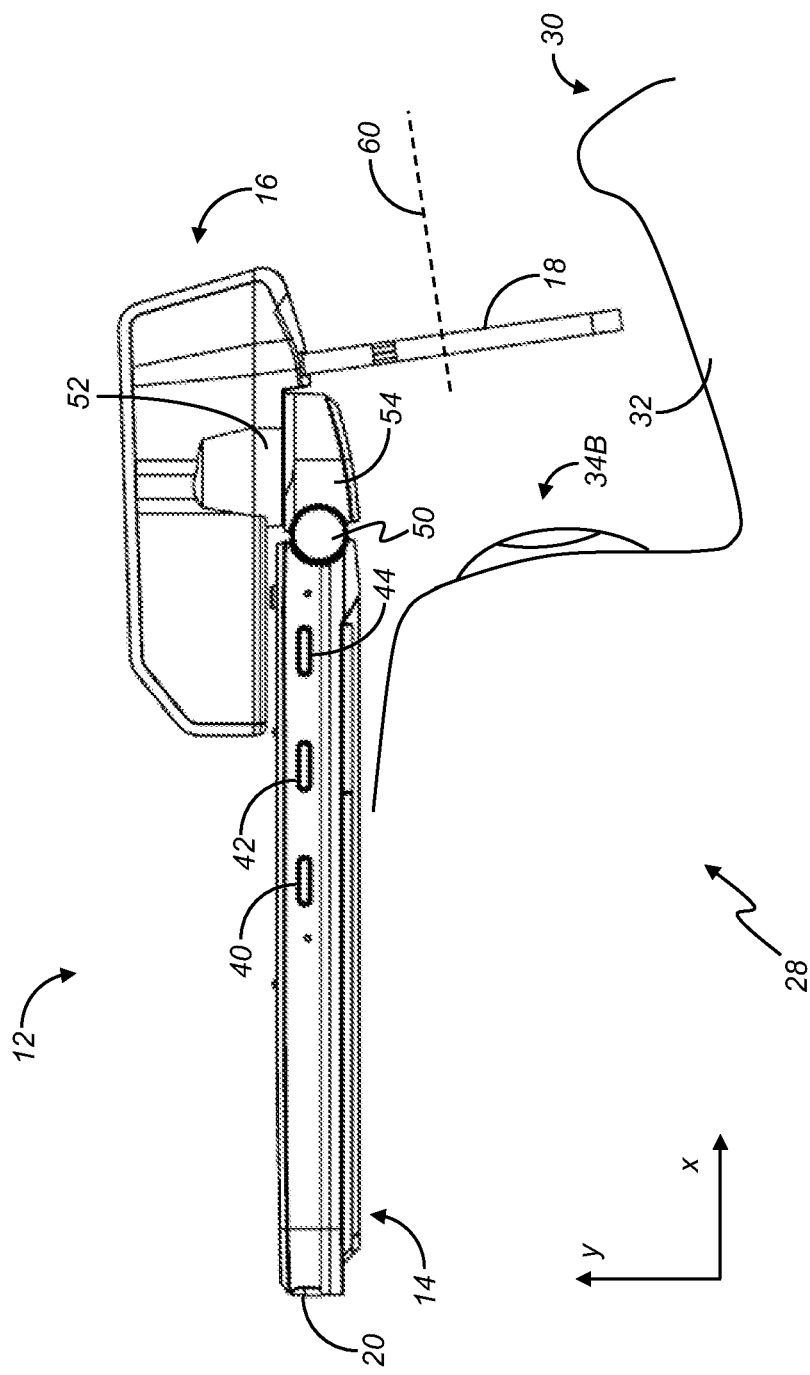
FIG. 1B shows a top-down view of a near-eye display system according to an exemplary embodiment of the presently disclosed subject matter.

Referring now to FIG. 1A, in an embodiment, a near-eye display system 12 comprises an electronic module 14, an optics module 16, and a planar waveguide 18. A mount module 54 is configured to mechanically secure the electronic module 14 to the optics module 16 while allowing the optics module 16 to be rotated in at least one direction with respect to the electronic module 14. As illustrated in FIG. 1A, when utilized by a person 28, the near-eye display system 12 may be positioned near a right eye 34A, nose 30, and nose bridge 32 of the person 28. As illustrated in FIG. 1B, in an embodiment, the near-eye display system 12 is positioned for left eye 34B usage of the near-eye display system 12.

Figure 3:
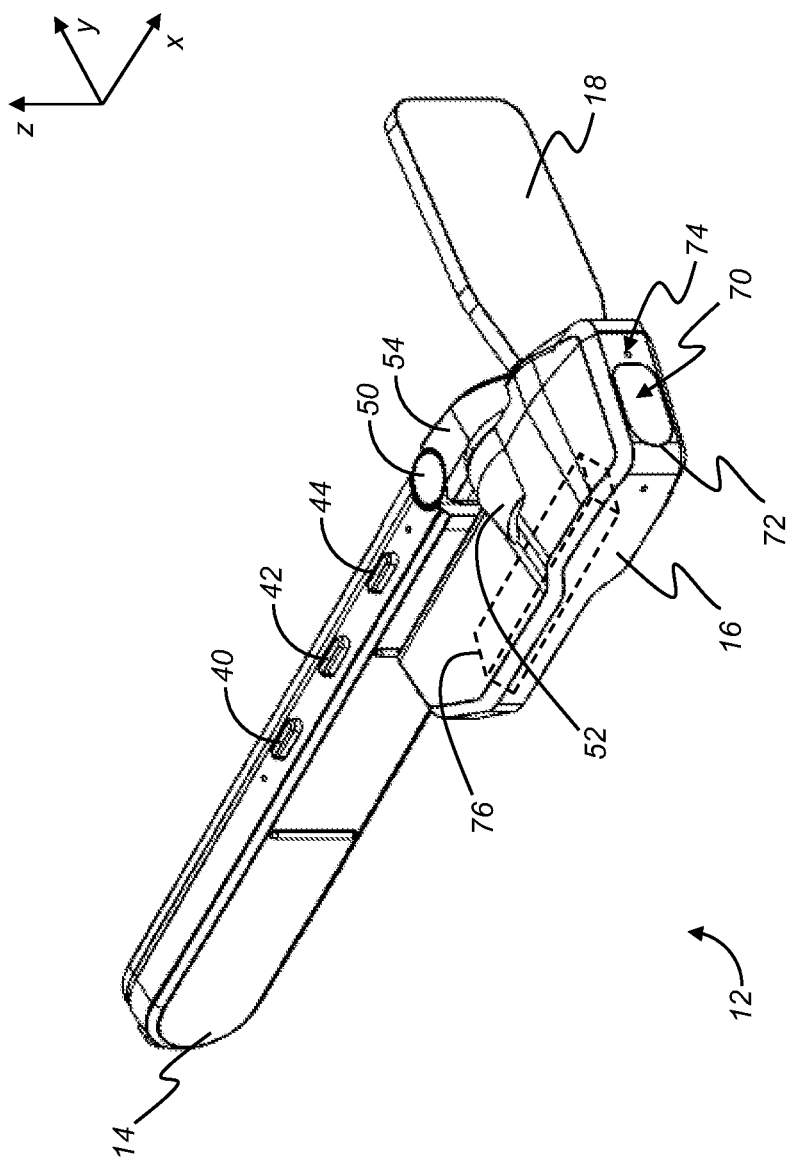
FIG. 3 shows a perspective view of a near-eye display system according to an exemplary embodiment of the presently disclosed subject matter.
Figure 4:
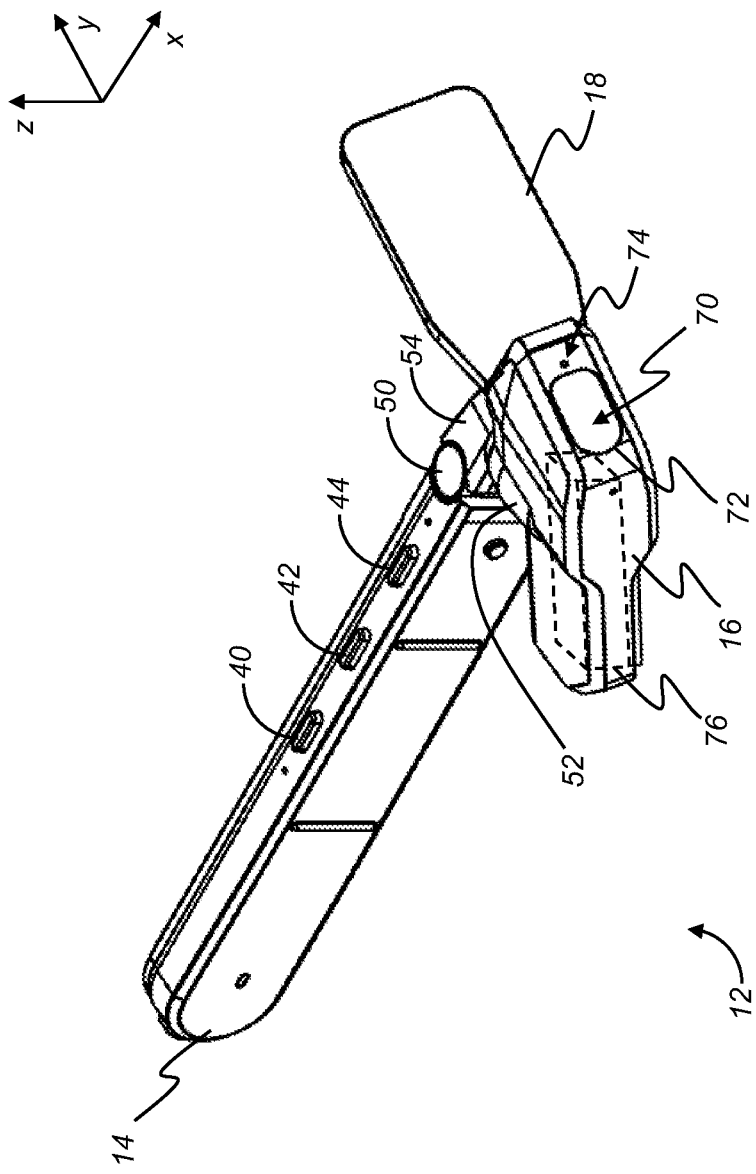
FIG. 4 shows a perspective view of the near-eye display system according to FIG. 3 in a pivoted position.
Figure 5:
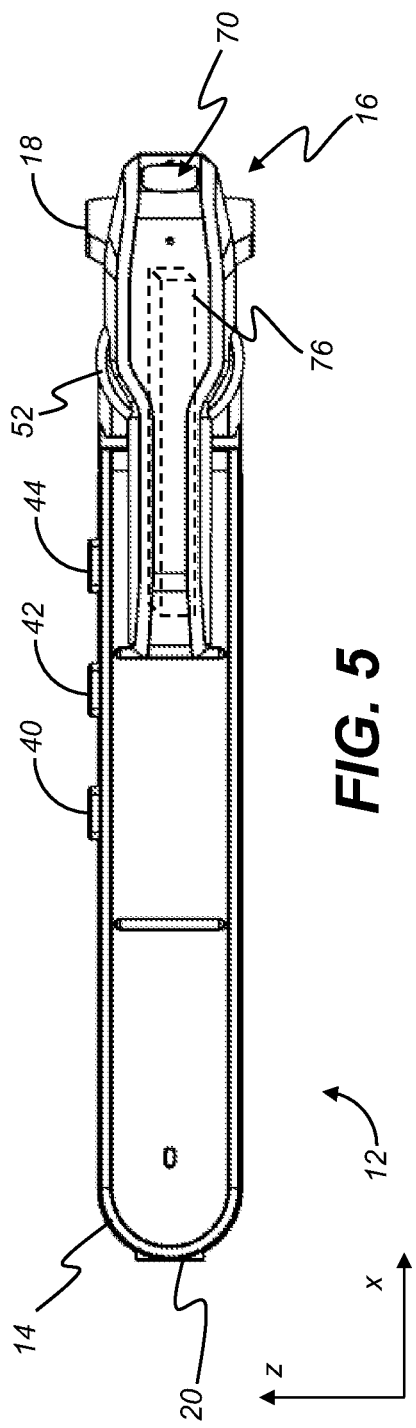
FIG. 5 shows a side elevational view of the near-eye display system according to FIG. 3.
Figure 6:
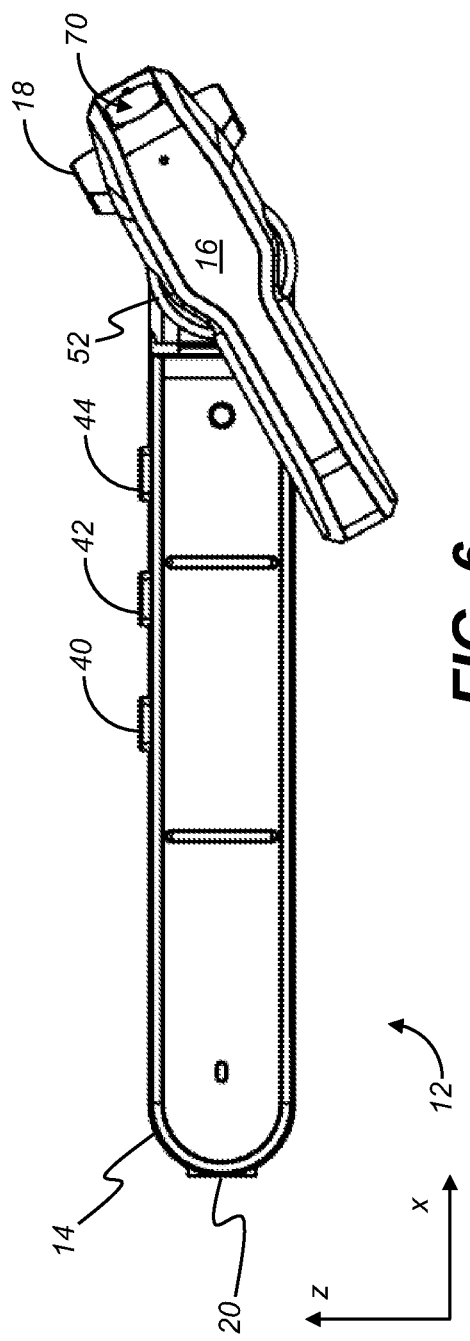
FIG. 6 shows a side elevational view of the near-eye display system according to FIG. 3 in a pivoted position.
Figure 7:
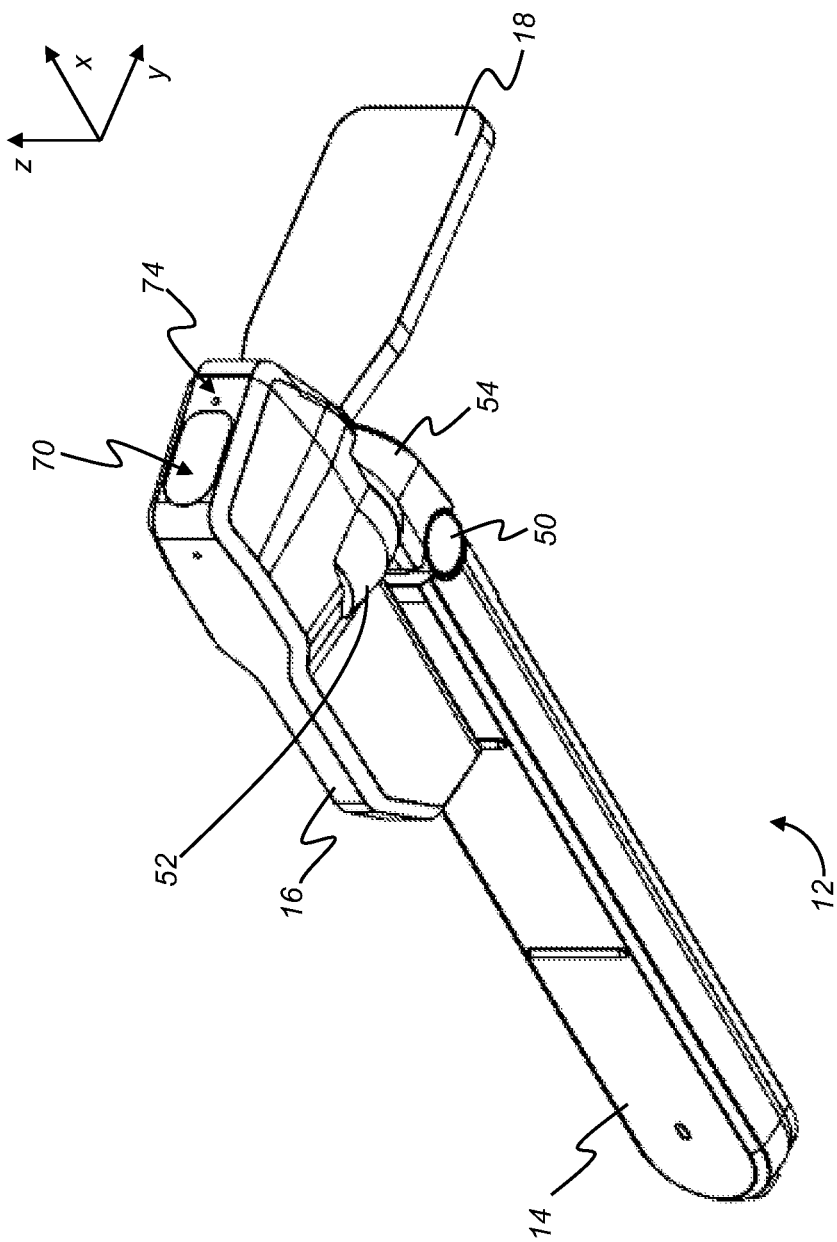
FIG. 7 shows a perspective view of a near-eye display system according to an exemplary embodiment of the presently disclosed subject matter.

With continued reference to FIGS. 1A and 1B, in an embodiment, the near-eye display system 12 includes one or more buttons 40, 42, 44 for operating near-eye display system. For example, the buttons 40, 42, 44 may be used to, without limitation, turn the near-eye display system 12 On and Off, navigate information displayed by the planar waveguide 18, select from a list of options being displayed to the person 28 by the planar waveguide 18, change display characteristics (e.g. color, brightness) of the information displayed by the planar waveguide 18, take a picture utilizing integrated camera 70 (see FIG. 3), and initiate and stop the recording of video utilizing the camera 70.

In an embodiment, the electronic module 14 includes wireless communication means (e.g. Bluetooth and/or WiFi) such as, but not limited to, an integrated circuit and/or integrated circuit chip operable to create a wireless local area network connection with one or more other electronic devices. The electronic module 14 also includes one or more batteries or other electrical power storage devices such as, but not limited to, a lithium-ion battery (LIB). In addition, the electronic module 14 includes one or more electrical ports 20 for connecting to other electronic devices by wire (e.g. external electrical power supplies, external audio system, etc.). The electronic module 14 may further include a controller having a central processing unit (CPU) operable to execute stored computer code, and send/receive signals to and from sensors including, but not limited to, a tilt-tip sensor (e.g., inclinometer), an accelerometer, a temperature sensor, a gyroscope, and a global positioning system (GPS) receiver.

Referring now to FIGS. 3, 7, 8A and 8B, in an embodiment, the optics module 16 includes one or more integrated cameras 70 and one or more ports 72 through which the one or more integrated cameras 70 are operable to view the environment. The optics module 16 may also include a camera flash light 74 operable to produce a flash for photography and videography and/or a light source to illuminate the environment at least partially surrounding the near-eye display system 12. In addition, the optics module 16 includes an image display generator 76 operable to provide images to be displayed to the person 28 via the planar waveguide 18. In an embodiment, the image display generator 76 is an image projector is operable to generate a full range of angularly encoded beams for producing a virtual image. In an embodiment, the port 72 at least partially houses a camera flash and/or a light source.

Figure 2:
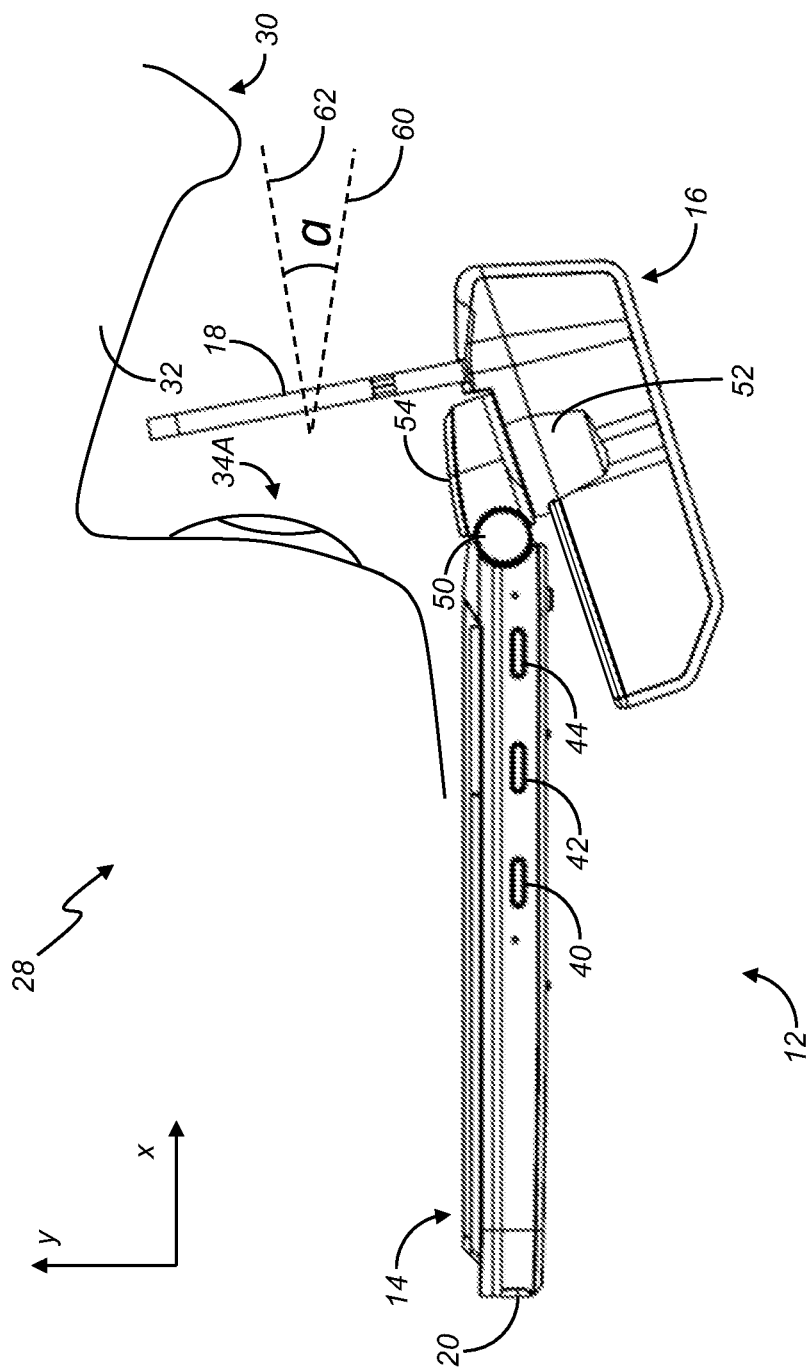
FIG. 2 shows a top-down view of the near-eye display system according to FIG. 1A in a pivoted position.

In an embodiment, the planar waveguide 18 is detachable from the optics module 16. In another embodiment, planar waveguide 18 is not detachable from the optics module 16. Referring now to FIGS. 1A-2, orientation of the planar waveguide 18 and the one or more integrated cameras 70 in a first position is indicated by a dashed line 60. The dashed line 60 is oriented perpendicular to a first and second planar surface of the planar waveguide 18.

The electronics module 14 is rotatably/pivotably connected to the mount module 54 by a pivot 50. In an embodiment, as illustrated in FIG. 2, the mount module 54 and the optics module 16 may be rotated and/or pivoted relative to the electronics module 14 about at least one axis. For example, the optics module 16 may be operable to rotate about the z-axis of the pivot 50 (see FIG. 3). Thus, the planar waveguide 18 and the one or more integrated cameras 70 are rotated with respect to electronics module 14. Orientation of the planar waveguide 18 and the one or more integrated cameras 70 in a second position is indicated by a dashed line 62. The dashed line 62 is a line perpendicular to the first and second planar surfaces of the planar waveguide 18. Comparing the dashed line 60 to the dashed line 62 defines the rotation angle α.

The optics module 16 is rotatably/pivotably connected to the mount module 54 by a pivot 52. The optics module 16 is coupled with the mount module 54 via the pivot 52. In an embodiment, as illustrated in FIGS. 3-6, the optics module 16 may be rotated and/or pivoted relative to the electronics module 14 and the mount module 54 about at least one axis. For example, the optics module 16 may be operable to rotate about the y-axis of the pivot 52 (see FIGS. 4 and 5). The optics module 16 may be rotated generally perpendicular to the rotational axis of the pivot 50 via the pivot 52.

The pivot 50 and the pivot 52 provide means for allowing electrical power, signals and/or data to be communicated to and from the optical module 16 and the controller and various modules of the near-eye display system 12. In an embodiment, the pivot 50 and the pivot 52 have holes located at least partially therethrough allowing electrical connections (e.g. electrical wires) to pass through the pivots 50, 52. Thus, the electronics module 14 may be electrically connected to the mount module 54 and to the optics module 16. The electrical connectivity between the electronics module 14 and the optics module 16 may be bi-directional. For example, signals and/or data from the one or more integrated cameras 70 located at least partially in the optics module 16 may be relayed to the electronics module 14.

One or more features of the embodiments described supra may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, not restrictive. The scope of the invention is indicated by the appended claims, and all changes that come within the meaning and range of equivalents thereof are intended to be embraced therein.

The invention claimed is:

1. A near-eye display system, comprising:
an optics module comprising:
a projector operable to generate angularly encoded light beams,
a transmissive waveguide operable to convey at least a portion of said light beams to an eyebox, and
a camera operable to capture images of an environment;
an electronics module having a controller in electrical connection with said optics module;
a mounting module located between said electronics module and said optics module, wherein said electronics module is coupled with said optics module via said mounting module;
a first pivot located between said optics module and said electronics module, wherein said optics module is rotatable relative to said electronics module about a first axis, and
a second pivot located between said optics module and said mounting module, wherein said optics module is rotatable relative to said mounting module and said electronics module about a second axis,
wherein said waveguide is coupled with said camera via said optics module, and a first view through said waveguide is aligned with a second view of said camera.

2. The near-eye display system according to claim 1, wherein said waveguide and said camera are operable to rotate relative to said electronics module and maintain alignment of said first view and said second view.

3. The near-eye display system according to claim 1, wherein said waveguide comprises a first field of view and said camera comprises a second field of view, and wherein said first view is oriented through a center of said first field of view and said second view is oriented through a center of said second field of view.

4. The near-eye display system according to claim 1, wherein said waveguide is operable to be arranged in a first position relative to said electronics module, and said waveguide is operable to be arranged in a second position relative to said electronics module.

5. The near-eye display system according to claim 1, wherein said first axis is oriented perpendicular to said second axis.

6. The near-eye display system according to claim 1, wherein said waveguide comprises a planar waveguide.

7. The near-eye display system according to claim 1, wherein said optics module comprises a light source operable to at least partially illuminate said environment in said second view.

8. The near-eye display system according to claim 1, wherein said electronics module comprises one or more buttons configured to operate said near-eye display system.

9. The near-eye display system according to claim 8, wherein said one or more buttons comprise a first button arranged to control an ON/OFF state of said near-eye display system, and a second button arranged to control said camera.

10. The near-eye display system according to claim 1, wherein said electronics module comprises first and second opposing surfaces, wherein said waveguide is arranged transverse to said first surface, and wherein at least a portion of said optics module is arranged adjacent to said second surface.

11. The near-eye display system according to claim 1, wherein said electronics module comprises first and second opposing surfaces, wherein said first surface is configured to be located adjacent to a user, and wherein at least a portion of said optics module is arranged adjacent to said second surface.

12. The near-eye display system according to claim 11, wherein said projector and said camera are arranged outward of said second surface.

13. The near-eye display system according to claim 1, wherein said first pivot comprises a vertical axis and said second pivot comprises a horizontal axis.

14. The near-eye display system according to claim 1, wherein an electrical connection of said optics module and said electronics module is arranged through said first pivot and said second pivot.

15. A near-eye display system, comprising:
an optics module comprising:
a projector operable to generate angularly encoded light beams,
a transmissive waveguide operable to convey at least a portion of said light beams to an eyebox, and
a camera operable to capture images of an environment;
an electronics module having a controller in electrical connection with said optics module, wherein said electronics module comprises a first button arranged to control an ON/OFF state of said near-eye display system, and a second button arranged to control said camera; and a first pivot located between said optics module and said electronics module, wherein said optics module is rotatable relative to said electronics module about a first axis, wherein said waveguide is coupled with said camera via said optics module, and a first view through said waveguide is aligned with a second view of said camera.

16. The near-eye display system according to claim 15, wherein said electronics module comprises first and second opposing surfaces, wherein said waveguide is arranged transverse to said first surface, and wherein at least a portion of said optics module is arranged adjacent to said second surface.

17. The near-eye display system according to claim 15, wherein said electronics module comprises first and second opposing surfaces, wherein said first surface is configured to be located adjacent to a user, and wherein at least a portion of said optics module is arranged adjacent to said second surface.

18. The near-eye display system according to claim 17, wherein said projector and said camera are arranged outward of said second surface.

* * * * *